(12) United States Patent
Koza

(10) Patent No.: US 9,116,744 B2
(45) Date of Patent: Aug. 25, 2015

(54) RESOURCE MANAGEMENT WITHIN A PROCESS VIA ITERATIVE NEGOTIATION

(75) Inventor: Phillip Richard Koza, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 373 days.

(21) Appl. No.: 13/606,611

(22) Filed: Sep. 7, 2012

(65) Prior Publication Data

US 2014/0075024 A1    Mar. 13, 2014

(51) Int. Cl.
*G06F 15/173* (2006.01)
*G06F 9/50* (2006.01)
*H04L 29/06* (2006.01)
*H04W 28/26* (2009.01)

(52) U.S. Cl.
CPC ............... *G06F 9/5011* (2013.01); *G06F 9/50* (2013.01); *H04L 63/104* (2013.01); *H04W 28/26* (2013.01); *G06F 2209/504* (2013.01); *Y02B 60/142* (2013.01)

(58) Field of Classification Search
USPC ........................................................ 709/225
See application file for complete search history.

(56) References Cited

U.S. PATENT DOCUMENTS

| | | | |
|---|---|---|---|
| 6,498,806 B1 * | 12/2002 | Davis | 375/222 |
| 6,574,720 B1 | 6/2003 | Hopeman et al. | |
| 8,190,843 B1 * | 5/2012 | de Forest et al. | 711/170 |
| 8,386,391 B1 * | 2/2013 | Blanding | 705/59 |
| 2007/0264986 A1 | 11/2007 | Warrillow et al. | |
| 2008/0215846 A1 * | 9/2008 | Aman et al. | 711/173 |
| 2009/0006801 A1 * | 1/2009 | Shultz et al. | 711/170 |
| 2010/0100700 A1 * | 4/2010 | Krauss | 711/206 |
| 2010/0153157 A1 | 6/2010 | Wade et al. | |
| 2010/0306494 A1 * | 12/2010 | DeVilbiss et al. | 711/170 |

FOREIGN PATENT DOCUMENTS

| | | |
|---|---|---|
| WO | 02/09358 A3 | 1/2001 |
| WO | 2011/008219 A1 | 1/2011 |

OTHER PUBLICATIONS

Andrea Sikeler, Var-page-lru a buffer replacement algorithm supporting different page sizes, Advances in Database Technology—EDBT '88, Lecture Notes in Computer Science, 1988, vol. 303/1988, 336-351, DOI: 10.1007/3-540-19074-0_61, http://www.springerlink.com/content/f0056315t6340324/.

(Continued)

*Primary Examiner* — Richard G Keehn
(74) *Attorney, Agent, or Firm* — North Shore Patents, P.C.; Michele Liu Baillie; Lesley Leonessa

(57) ABSTRACT

A system and method manages resources within a process by identifying a first resource threshold associated with available resources. The method receives a resource request from a resource requesting participant requiring the available resources. The method determines that an estimated resource usage, associated with the resource request, approaches the first resource threshold. The method negotiates with at least one resource consuming participant to voluntarily release resources until the estimated resource usage approaches a second resource threshold associated with the available resources within the process.

20 Claims, 11 Drawing Sheets

(56) References Cited

OTHER PUBLICATIONS

Rajiv Jauhari, Michael J. Carey, Miron Livny, Priority-Hints: An Algorithm for Priority-Based Buffer Management, Computer Sciences Department, University of Wisconsin, Madison, WI 53706, http://www.vldb.org/conf/1990/P708.PDF.

Sikeler, A.; "VAR-PAGE-LRU A buffer replacement algorithm supporting different page sizes"; Proceedings in the International Conference on Extending Database Technology; pp. 336-351; Mar. 1988.
Jauhari, R. et al.; "Priority-Hints: An Algorithm for Priority-Based Buffer Management"; Proceedings of the 16th VLDB Conference; pp. 708-721; Aug. 1990.

* cited by examiner

205 IDENTIFY, WITHIN THE PROCESS, A FIRST RESOURCE THRESHOLD ASSOCIATED WITH AVAILABLE RESOURCES

206 IDENTIFY A RESOURCE LIMIT ASSOCIATED WITH THE PROCESS

207 DETERMINE AT LEAST ONE OF THE FIRST RESOURCE THRESHOLD AND THE SECOND RESOURCE THRESHOLD BASED ON A MATHEMATICAL CALCULATION ASSOCIATED WITH THE RESOURCE LIMIT

OR

208 DYNAMICALLY TUNE AT LEAST ONE OF THE FIRST RESOURCE THRESHOLD AND THE SECOND RESOURCE THRESHOLD DURING AT LEAST ONE OF:
i)   IDENTIFYING THE FIRST RESOURCE THRESHOLD
ii)  RECEIVING THE RESOURCE REQUEST
iii) DETERMINING THAT THE ESTIMATED RESOURCE USAGE APPROACHES THE FIRST RESOURCE THRESHOLD
iv)  NEGOTIATING WITH THE AT LEAST ONE RESOURCE CONSUMING PARTICIPANT
v)   GRANTING PERMISSION TO ACCESS THE AVAILABLE RESOURCES

FIG. 4

```
210 RECEIVE, BY THE PROCESSOR, A RESOURCE REQUEST FROM A RESOURCE REQUESTING
PARTICIPANT REQUIRING THE AVAILABLE RESOURCES

211 RECEIVE A REGISTRATION REQUEST FROM THE RESOURCE
    REQUESTING PARTICIPANT
                     │
                     ▼
    212 REGISTER THE RESOURCE REQUESTING PARTICIPANT AS A
    POTENTIAL CONSUMER OF AVAILABLE RESOURCES

OR

213 RECEIVE RESOURCE USAGE INFORMATION FROM THE RESOURCE
    REQUESTING PARTICIPANT
                     │
                     ▼
    214 BASED ON THE RESOURCE USAGE INFORMATION, PRIORITIZE THE
    RESOURCE REQUESTING PARTICIPANT WITH RESPECT TO A
    PLURALITY OF RESOURCE REQUESTING PARTICIPANTS
```

FIG. 5

215 DETERMINE, BY THE PROCESSOR, THAT AN ESTIMATED RESOURCE USAGE, ASSOCIATED WITH THE RESOURCE REQUEST, APPROACHES THE FIRST RESOURCE THRESHOLD

216 ADD THE RESOURCE REQUEST TO A TOTAL RESOURCE USAGE TO OBTAIN THE ESTIMATED RESOURCE USAGE

217 COMPARE THE ESTIMATED RESOURCE USAGE TO THE FIRST RESOURCE THRESHOLD

FIG. 6

218 NEGOTIATE, BY THE PROCESSOR, WITH AT LEAST ONE RESOURCE CONSUMING PARTICIPANT TO VOLUNTARILY RELEASE RESOURCES UNTIL THE ESTIMATED RESOURCE USAGE APPROACHES A SECOND RESOURCE THRESHOLD ASSOCIATED WITH THE AVAILABLE RESOURCES WITHIN THE PROCESS

219 DETERMINE A TARGET RESOURCE RELEASE AMOUNT ASSOCIATED WITH THE ESTIMATED RESOURCE USAGE APPROACHES THE SECOND RESOURCE THRESHOLD

↓

220 REQUEST THAT THE AT LEAST ONE RESOURCE CONSUMING PARTICIPANT VOLUNTARILY RELEASE RESOURCES UNTIL THE TARGET RESOURCE RELEASE AMOUNT IS ACHIEVED

↓

221 DETERMINE THAT NEGOTIATION WITH THE AT LEAST ONE RESOURCE CONSUMING PARTICIPANT HAS FAILED TO RELEASE SUFFICIENT AVAILABLE RESOURCES TO APPROACH THE SECOND RESOURCE THRESHOLD

222 REPEAT THE STEP OF REQUESTING THAT THE AT LEAST ONE RESOURCE CONSUMING PARTICIPANT VOLUNTARILY RELEASE RESOURCES UNTIL THE TARGET RESOURCE RELEASE AMOUNT IS ACHIEVED

OR

223 SUSPEND NEGOTIATION WITH THE AT LEAST ONE RESOURCE CONSUMING PARTICIPANT

↓

224 RESUME NEGOTIATION WITH THE AT LEAST ONE RESOURCE CONSUMING PARTICIPANT

FIG. 7

225 NEGOTIATE, BY THE PROCESSOR, WITH AT LEAST ONE RESOURCE CONSUMING PARTICIPANT TO VOLUNTARILY RELEASE RESOURCES UNTIL THE ESTIMATED RESOURCE USAGE APPROACHES A SECOND RESOURCE THRESHOLD ASSOCIATED WITH THE AVAILABLE RESOURCES WITHIN THE PROCESS

226 FOR EACH OF THE AT LEAST ONE RESOURCE CONSUMING PARTICIPANT:
i)  REQUEST THAT THE AT LEAST ONE RESOURCE CONSUMING PARTICIPANT RELEASE THE TARGET RESOURCE RELEASE AMOUNT OF RESOURCES
ii)  RECEIVE CONFIRMATION THAT THE AT LEAST ONE RESOURCE CONSUMING PARTICIPANT HAS RELEASED A RELEASED AMOUNT OF RESOURCES
iii)  RECALCULATE THE TARGET RESOURCE RELEASE AMOUNT BASED ON THE RELEASED AMOUNT OF RESOURCES 227 REQUEST THAT THE AT LEAST ONE RESOURCE CONSUMING PARTICIPANT RELEASE ONLY NON-ESSENTIAL RESOURCES

OR

228 REQUEST THAT THE AT LEAST ONE RESOURCE CONSUMING PARTICIPANT RELEASE ALL BUT ESSENTIAL RESOURCES

OR

229 REQUEST THAT THE AT LEAST ONE RESOURCE CONSUMING PARTICIPANT RELEASE ALL OF THE RESOURCES CURRENTLY CONSUMED

FIG. 8

230 NEGOTIATE, BY THE PROCESSOR, WITH AT LEAST ONE RESOURCE CONSUMING PARTICIPANT TO VOLUNTARILY RELEASE RESOURCES UNTIL THE ESTIMATED RESOURCE USAGE APPROACHES A SECOND RESOURCE THRESHOLD ASSOCIATED WITH THE AVAILABLE RESOURCES WITHIN THE PROCESS

> 231 REQUEST AN EQUITABLE PORTION OF THE TARGET RESOURCE RELEASE AMOUNT FROM EACH OF THE AT LEAST ONE RESOURCE CONSUMING PARTICIPANT

> 232 IN RESPONSE, RECEIVE A RELEASED AMOUNT OF RESOURCES

> 233 RECALCULATE THE TARGET RESOURCE RELEASE AMOUNT BASED ON THE RELEASED AMOUNT OF RESOURCES RECEIVED

FIG. 9

234 NEGOTIATE, BY THE PROCESSOR, WITH AT LEAST ONE RESOURCE CONSUMING PARTICIPANT TO VOLUNTARILY RELEASE RESOURCES UNTIL THE ESTIMATED RESOURCE USAGE APPROACHES A SECOND RESOURCE THRESHOLD ASSOCIATED WITH THE AVAILABLE RESOURCES WITHIN THE PROCESS

235 PRIORITIZE THE RESOURCES USED BY THE AT LEAST ONE RESOURCE CONSUMING PARTICIPANT WITH RESPECT TO OTHER RESOURCES IN USE

236 IN ORDER OF A PRIORITY OF THE RESOURCES:
i) REQUEST THAT THE AT LEAST ONE RESOURCE CONSUMING PARTICIPANT RELEASE THE TARGET RESOURCE RELEASE AMOUNT OF RESOURCES
ii) RECEIVE CONFIRMATION THAT THE AT LEAST ONE RESOURCE CONSUMING PARTICIPANT HAS RELEASED A RELEASED AMOUNT OF RESOURCES

237 RECALCULATE THE TARGET RESOURCE RELEASE AMOUNT BASED ON THE RELEASED AMOUNT OF RESOURCES

OR

238 PRIORITIZE THE AT LEAST ONE RESOURCE CONSUMING PARTICIPANT WITH RESPECT TO AT LEAST ONE OTHER RESOURCE CONSUMING PARTICIPANT

239 ITERATIVELY REQUEST FROM EACH OF THE AT LEAST ONE RESOURCE CONSUMING PARTICIPANT TO VOLUNTARILY RELEASE RESOURCE ACCORDING TO A PRIORITY ASSOCIATED WITH EACH OF THE AT LEAST ONE RESOURCE CONSUMING PARTICIPANT UNTIL THE TARGET RESOURCE RELEASE AMOUNT IS ACHIEVED

FIG. 10

RESOURCE MANAGEMENT WITHIN A PROCESS VIA ITERATIVE NEGOTIATION

BACKGROUND

A process running on a computer may have multiple threads running concurrently. Different threads may have different purposes, different priorities, may request resources at different frequencies, and may access different amounts of resources. Managing the available resources to provide the requested resources may be performed a number of different ways, such as allowing each thread to obtain as much of the resources it needs on a first-requested basis. The end result may be that the threads first requesting resources exhaust the resources before subsequent requesting threads get a share. Another strategy is to partition available resources into separate pools, and allow each thread to take resources only from its respective pool. This strategy ensures that each thread receives some resources, but some threads may not receive enough of their required resources, while other threads aren't utilizing all of the resources allocated in their respective pools.

BRIEF SUMMARY OF THE INVENTION

According to one embodiment of the present invention, in a method for managing resources by a computer system, a processor identifies, within a process, a first resource threshold associated with available resources. The method, via the processor, receives a resource request from a resource requesting participant requiring the available resources. The method, via the processor, determines that an estimated resource usage, associated with the resource request, approaches the first resource threshold. The method, via the processor, negotiates with at least one resource consuming participant to voluntarily release resources until the estimated resource usage approaches a second resource threshold associated with the available resources within the process. In an example embodiment, the method, via the processor, grants the resource requesting participant permission to access the available resources associated with the resource request. The available resources are obtained from resources voluntarily released by at least one resource consuming participant.

In one aspect of embodiments disclosed herein, when the method identifies the first resource threshold associated with available resource, the method identifies a resource limit associated with the process, and determines at least one of the first resource threshold and the second resource threshold based on a mathematical calculation associated with the resource limit.

In one aspect of embodiments disclosed herein, when the method identifies, within the process, a first resource threshold associated with available resources, the method dynamically tunes at least one of the first resource threshold and the second resource threshold. The thresholds are tuned during at least one of the steps of identifying the first resource threshold, receiving the resource request, determining that the estimated resource usage approaches the first resource threshold, negotiating with at least one resource consuming participant, and granting permission to access the available resources.

In one aspect of embodiments disclosed herein, when the method receives a resource request from a resource requesting participant requiring the available resources, the method receives a registration request from the resource requesting participant, and the method registers the resource requesting participant as a potential consumer of available resources.

In one aspect of embodiments disclosed herein, when the method receives a resource request from a resource requesting participant requiring the available resources, the method receives resource usage information from the resource requesting participant. Based on the resource usage information, the method prioritizes the resource requesting participant with respect to a plurality of resource requesting participants.

In one aspect of embodiments disclosed herein, when the method determines that an estimated resource usage, associated with the resource request, approaches the first resource threshold, the method adds the resource request to a total resource usage to obtain the estimated resource usage, and compares the estimated resource usage to the first resource threshold.

In one aspect of embodiments disclosed herein, when the method negotiates with at least one resource consuming participant to voluntarily release resources until the estimated resource usage approaches a second resource threshold associated with the available resources within the process, the method determines a target resource release amount associated with the estimated resource usage approaches the second resource threshold. The method requests that at least one resource consuming participant voluntarily releases resources until the target resource release amount is achieved.

In one aspect of embodiments disclosed herein, the method determines that negotiation with the resource consuming participants has failed to release sufficient available resources to approach the second resource threshold. In one aspect of embodiments disclosed herein, the method repeats the step of requesting that at least one resource consuming participant voluntarily releases resources until the target resource release amount is achieved. In another aspect of embodiments disclosed herein, the method suspends negotiation with at least one resource consuming participant, and then later resumes negotiation with at least one resource consuming participant.

In one aspect of embodiments disclosed herein, when the method requests that at least one resource consuming participant voluntarily releases resources until the target resource release amount is achieved, for each of the resource consuming participants, the method requests that the resource consuming participant releases the target resource release amount of resources. The method receives confirmation that the resource consuming participant has released a released amount of resources, and recalculates the target resource release amount based on the released amount of resources.

In one aspect of embodiments disclosed herein, when the method requests that at least one resource consuming participant releases the target resource release amount of resources, the method requests that at least one resource consuming participant releases only non-essential resources.

In one aspect of embodiments disclosed herein, when the method requests that at least one resource consuming participant releases the target resource release amount of resources, the method requests that the resource consuming participant releases all but essential resources.

In one aspect of embodiments disclosed herein, when the method requests that at least one resource consuming participant releases the target resource release amount of resources, the method requests that the resource consuming participant releases all of the resources currently consumed.

In one aspect of embodiments disclosed herein, when the method requests that at least one resource consuming participant voluntarily releases resources until the target resource release amount is achieved, the method requests an equitable portion of the target resource release amount from each of the resource consuming participants. In response, the method receives a released amount of resources, and then recalculates the target resource release amount based on the released amount of resources received.

In one aspect of embodiments disclosed herein, when the method requests that at least one resource consuming participant voluntarily releases resources until the target resource release amount is achieved, the method prioritizes the resources used by at least one resource consuming participant with respect to other resources in use. In order of the priority of the resources, the method requests that at least one resource consuming participant releases the target resource release amount of resources, and receives confirmation that at least one resource consuming participant has released a released amount of resources. The method recalculates the target resource release amount based on the released amount of resources.

In one aspect of embodiments disclosed herein, when the method requests that at least one resource consuming participant voluntarily releases resources until the target resource release amount is achieved, the method prioritizes at least one resource consuming participant with respect to at least one other resource consuming participant, and iteratively requests from each of the resource consuming participants to voluntarily release resource according to a priority associated with each of the resource consuming participants, until the target resource release amount is achieved.

In one aspect of embodiments disclosed herein, the method registers with a resource manager to receive permission to access available resources, and provides resource usage information to the resource manager. The method receives permission to access available resources from the resource manager. The method receives a request from the resource manager to voluntarily release a portion of the available resources, determines which portion of the available resources to release, and voluntarily releases a portion of the available resources. The method notifies the resource manager of the portion of the available resources released.

System and computer program products corresponding to the above-summarized methods are also described and claimed herein.

BRIEF DESCRIPTION OF THE SEVERAL VIEWS OF THE FIGURES

FIG. 4 is a flowchart illustrating an embodiment of a method for managing resources where the method identifies a first resource threshold associated with available resources, according to the present invention.

FIG. 5 is a flowchart illustrating an embodiment of a method for managing resources where the method receives a resource request, according to the present invention.

FIG. 6 is a flowchart illustrating an embodiment of a method for managing resources where the method determines that an estimated resource usage approaches a first resource threshold, according to the present invention.

FIG. 7 is a flowchart illustrating an embodiment of a method for managing resources where the method negotiates with at least one resource consuming participant to voluntarily release resources, according to the present invention.

FIG. 8 is a flowchart illustrating an embodiment of a method for managing resources where the method sequentially negotiates with at least one resource consuming participant to voluntarily release resources, according to the present invention.

FIG. 9 is a flowchart illustrating an embodiment of a method for managing resources where the method negotiates with at least one resource consuming participant to voluntarily release equitable portions of resources, according to the present invention.

FIG. 10 is a flowchart illustrating an embodiment of a method for managing resources where the method, after prioritizing the resources, negotiates with at least one resource consuming participant to voluntarily release resources, according to the present invention.

DETAILED DESCRIPTION OF THE INVENTION

Figure 1:
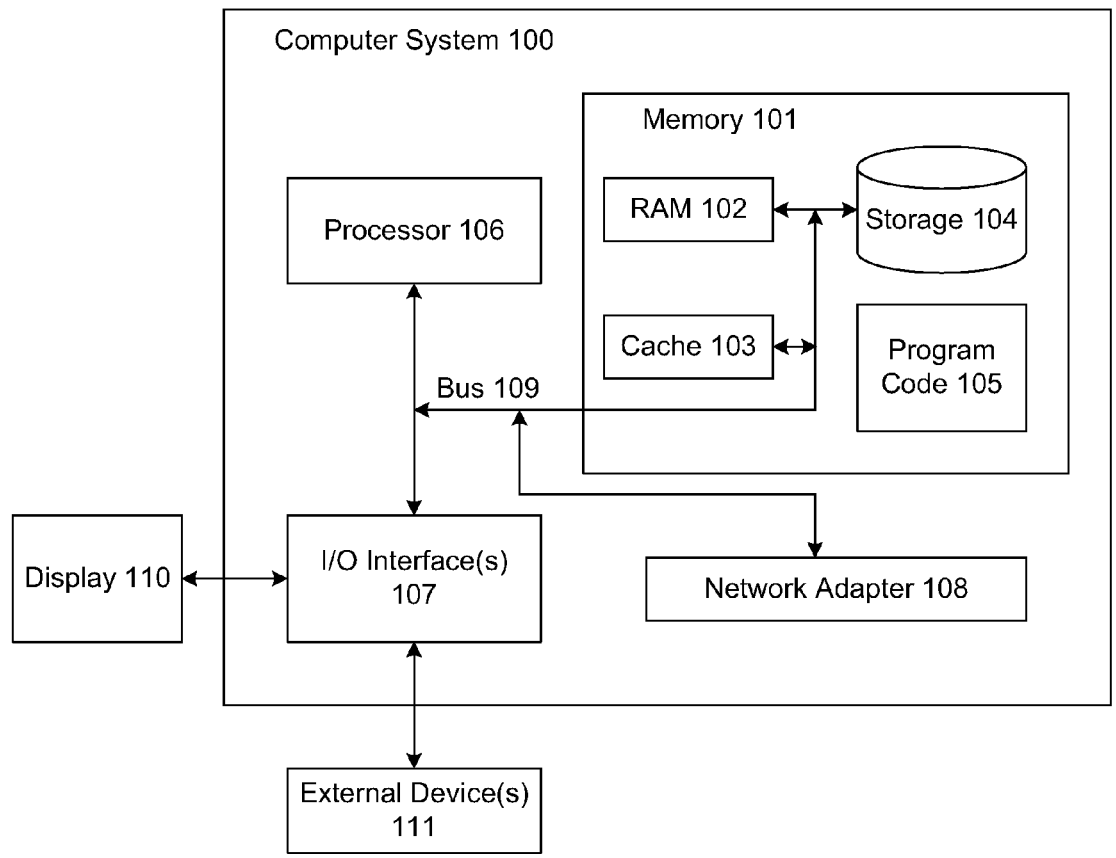
FIG. 1 illustrates an embodiment of a system for managing resources according to the present invention.

The present invention provides a system and method for managing resources. This may include any type of resources such as, for example, memory, processor execution and communication, such as via a bus, network or peripheral adapter. The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiment was chosen and described in order to best explain the principles of the invention and the practical application, and to enable others of ordinary skill in the art to understand the invention for various embodiments with various modifications as are suited to the particular use contemplated. For example, embodiments of the present invention are described herein in which a central resource manager thread negotiates allocation of resources used by other threads within the same process as the one in which the central resource manager executes. Many modifications and variations will be apparent to those of ordinary skill in the art without departing from the scope and spirit of the invention. For example, a process resource manager may be provided in some variations to negotiate with other processes for allocating system resources among the processes. While this may be useful, it should also be understood that this arrangement adds overhead and corresponding inefficiency. In applications where resources are particularly limited, added overhead may become a limiting issue. In one variation, each central resource manager thread of each process may negotiate resource allocation with the threads of its respective process and may also communicate with the process resource manager on behalf of the threads of its respective process to negotiate resource allocation among the processes. This communication arrangement may mitigate overhead issues.

Regardless of the variations, it should be understood that at least some aspects of the methods and structures described herein relating to resource allocation, negotiation, communication, etc. may apply regardless of whether negotiation and communication occurs between a resource manager thread and the other threads of the same process or between a resource manager process and other processes and regardless of whether resources are consequently allocated to a thread or a process. Accordingly, the term "participant" is used herein, which may apply to either threads or processes or both.

FIG. 1 illustrates an embodiment of a system for managing resources within a process according to the present invention. The computer system 100 is operationally coupled to a processor or processing units 106, a memory 101, and a bus 109 that couples various system components, including the memory 101 to the processor 106. The bus 109 represents one or more of any of several types of bus structures, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code modules 105 that are configured to carry out the functions of embodiments of the present invention when executed by the processor 106. The computer system 100 may also communicate with one or more external devices 111, such as a display 110, via I/O interfaces 107. The computer system 100 may communicate with one or more networks via network adapter 108.

Figure 2:
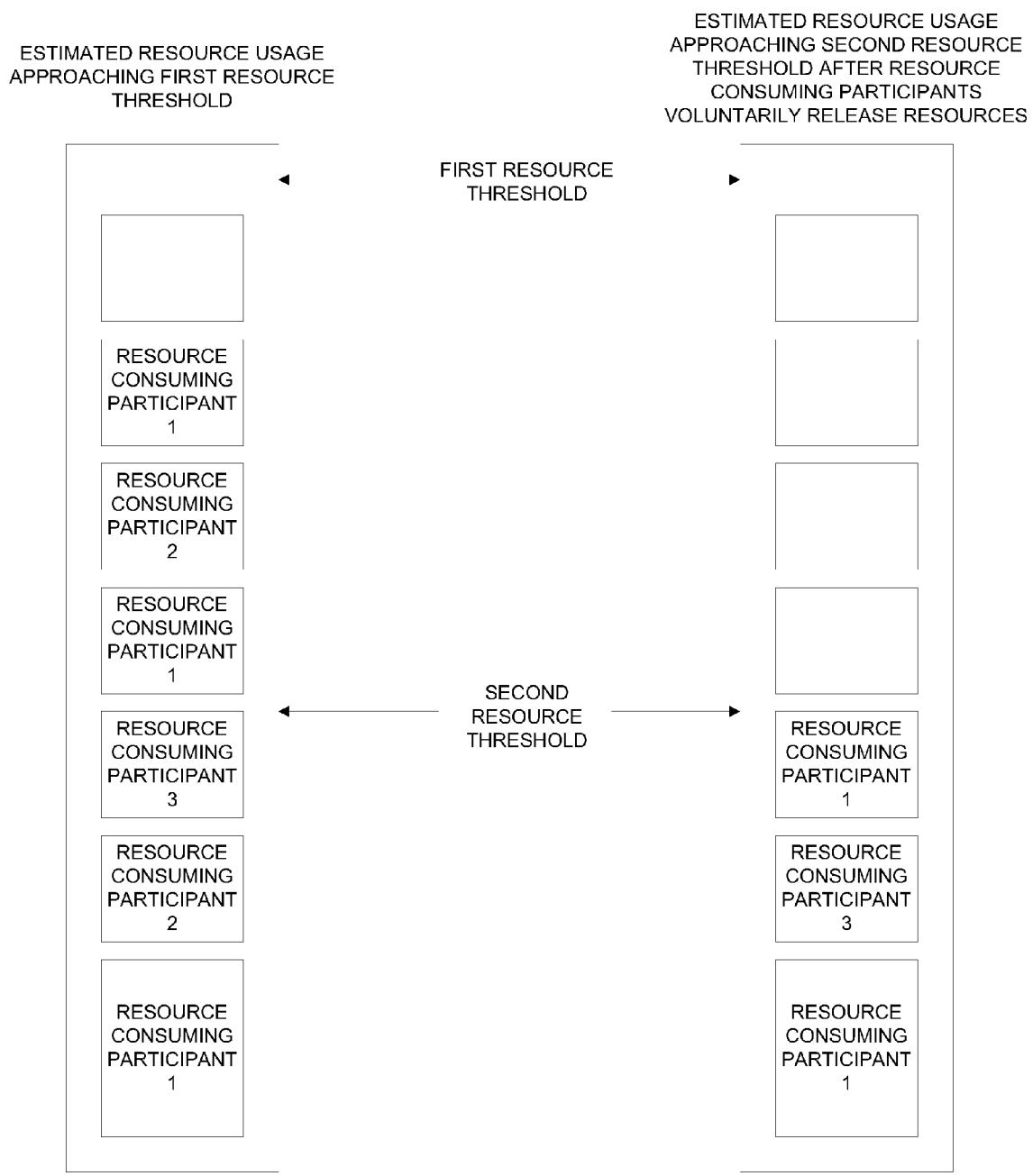
FIG. 2 illustrates an embodiment of a method for managing resources according to the present invention.

FIG. 2 illustrates an embodiment of a method for managing resources. The method, via the processor, identifies, within the process, a first resource threshold associated with available resources, such as, for example, a threshold for memory that is available for use by threads within the process. The method receives, via the processor, a resource request from a resource requesting participant requiring at least some of the available resources. The request has an anticipated or known, i.e., predetermined, resource usage associated with it. The method determines, via the processor, that an estimated total resource usage will approach the first resource threshold in order to satisfy the resource request. In an example embodiment, "approaching" the first resource threshold may mean exceeding the first resource threshold. In another example embodiment, "approaching" may mean coming within a predetermined range of the first resource threshold, but not exceeding the first resource threshold. The method negotiates, via the processor, with at least one resource consuming participant (such as resource consuming participant 1, resource consuming participant 2 and/or resource consuming participant 3) to voluntarily release resources until the estimated resource usage approaches a second resource threshold associated with the available resources within the process. The method grants, via the processor, the resource requesting participant permission to access the available resources associated with the resource request, where the available resources may be obtained from resources voluntarily released by at least one resource consuming participant (such as resource consuming participant 1, resource consuming participant 2 and/or resource consuming participant 3). In an example embodiment, the resource management process will only ask a resource consuming participant to release resources when a resource requesting participant's request for resources causes the estimated resource usage to approach the first resource threshold.

Figure 3:
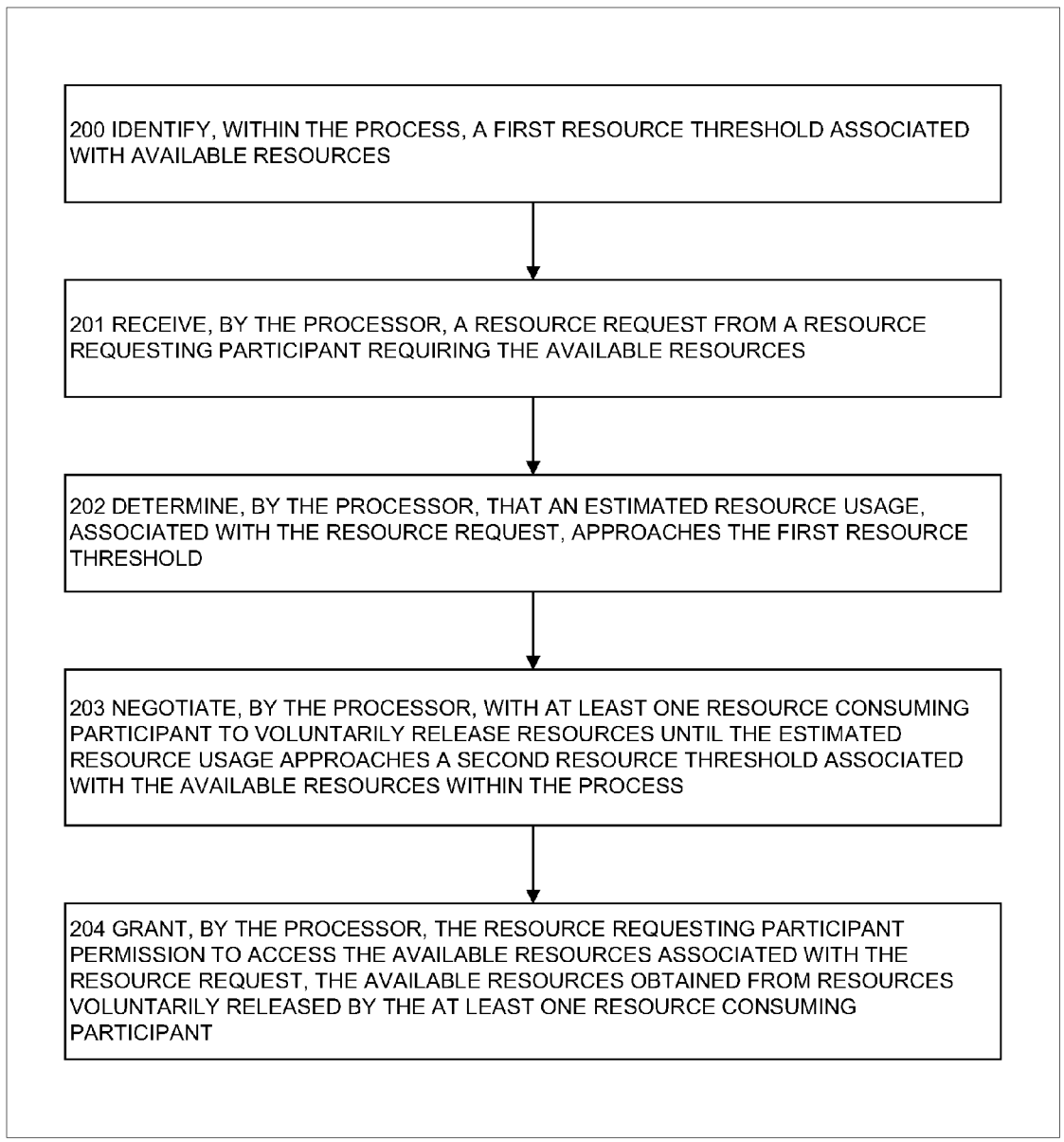
FIG. 3 is a flowchart illustrating an embodiment of a method for managing resources according to the present invention.

FIG. 3 is a flowchart of an example embodiment of the present invention for managing resources. In 200, the method identifies, within the process, a first resource threshold associated with available resources. In an example embodiment, the method, operating a central resource manager component, manages a pool of resources available to resource participants. In an example embodiment, the resource participants are threads running within the process. The central resource manager component may, itself, be a thread running within the process. The method works with the resource participants to ensure that the resources are utilized for more nearly optimal purposes. The method monitors the resource usage, and identifies when the available resources are getting low via the first resource threshold. In an example embodiment, the first resource threshold may be a "high-water mark".

In an example embodiment, the method monitors resource usage by receiving requests for resources, granting permission to access those resources, and maintaining resource usage within limits. In 201, the method receives a resource request from a resource requesting participant requiring at least some of the available resources. In an example embodiment, the resource requesting participant may be a participant that is currently consuming resources, or may be participant requesting resources for the first time. In an example embodiment, only participants that use a significant amount of resources and/or for an extended period of time request resources.

In 202, the method determines that an estimated resource usage associated with the resource request, approaches the first resource threshold. In an example embodiment, the method maintains an actual resource usage. With each request for resources, the method also maintains an estimated resource usage. The estimated resource usage is the actual resource usage plus the amount of resources associated with the resource request. In other words, the method determines how much of the resources are currently being used and adds to that the amount of requested resources to determine what the amount of estimated resource usage will be if permission is granted to access the requested resources. As shown in FIG. 2, when a resource request causes the estimated resource usage to approach the limits of the available resources, the method determines that granting permission to access the resources requested would cause the estimated resource usage to approach the first resource threshold.

In 203, in response to determining that the estimated resource usage, associated with the resource request, approaches the first response threshold, the method negotiates with at least one resource consuming participant to voluntarily release resources until the estimated resource usage approaches a second resource threshold associated with the available resources within the process. In an example embodiment, the method does not release any of the resources; all resource consuming participants retain control over the resources they possess. When the method determines that estimated resource usage is approaching the first resource threshold, the method asks resource consuming participants if they would be willing to release some of the resource they are holding. The polling of resource consuming participants proceeds in multiple iterations until the availability of the resource is within acceptable limits, for example, when the estimated resource usage approaches the second resource threshold. The method and the resource consuming participants iteratively negotiate, with the resource consuming participants cooperatively freeing portions of the resource until the required amount is freed.

In an example embodiment, the method negotiates with the resource consuming participants by sending them negotiation messages. Each resource consuming participant has a message queue that it monitors for negotiation messages from the method. The method has a reply message queue that the method monitors for resource consuming participant replies. These negotiation messages indicate:

1. The target resource release amount that the method requests the resource consuming participant release.
2. The registered amount of memory the resource consuming participant was using as of the time the method computed the target resource release amount for that resource consuming participant to free. Thus, a resource consuming participant can take credit for any amount of the resource it has already freed between the time the method computed the target resource release amount, and when the resource consuming participant services the request (i.e., releases a portion of the resource). The resource consuming participant only needs to reduce their resource usage to the registered amount less the target resource release amount. It is possible that a resource consuming participant will not need to release any further resource in order to comply with the request. The resource consuming participant responds with the amount of the resource it has released below the registered amount.
3. A Boolean value indicating if the resource consuming participant should free all but its most desirable portions of the resource (true), or all non-essential portions (false).

Each resource consuming participant replies with the amount of the resource it was able to free. If a resource consuming participant is unable to free any amount of the resource, it responds with zero. The resource consuming participant releases any resource before replying.

As shown in FIG. 2, after the resource consuming participants have voluntarily released some of their resources, the estimated resource usage approaches the second resource threshold.

In 204, the method grants the resource requesting participant permission to access the available resources associated with the resource request. The available resources are obtained from resources voluntarily released by at least one resource consuming participant. As shown in FIG. 2, after the estimated resource usage has dropped to the level of the second resource threshold, enough resources have been made available to grant permission to access the resources requested of the resource requesting participant, and the method grants the permission.

FIG. 4 is a flowchart of an example embodiment of the present invention when the method identifies a first resource threshold associated with available resources.

In 205, the method identifies a first resource threshold associated with available resources. As detailed above in 200, the method maintains a first resource threshold to indicate that the estimated resource usage is approaching the limit of resources available to the process.

In 206, the method identifies a resource limit associated with the process.

In 207, the method determines at least one of the first resource threshold and the second resource threshold based on a mathematical calculation associated with the resource limit. In an example embodiment, the first resource threshold and the second resource threshold may be calculated as a percentage of the total resources available to the process.

Alternatively, in 208, the method dynamically tunes at least one of the first resource threshold and the second resource threshold. In an example embodiment, the method may set and/or tune the first resource threshold and second resource threshold at anytime during the process. The setting and/or tuning may occur during the step of identifying the first resource threshold, receiving the resource request, determining that the estimated resource usage approaches the first resource threshold, negotiating with at least one resource consuming participant, and/or granting permission to access the available resources.

FIG. 5 is a flowchart of an example embodiment of the present invention when the method receives a resource request from a resource requesting participant requiring the available resources.

In 210, the method receives a resource request from a resource requesting participant requiring the available resources. In an example embodiment, the resource requesting participant may only send the resource request to the method when the amount of resources requested is above a resource threshold (i.e., a particular amount of resources and/or used for a particular length of time). The resource requesting participant may be a participant that is currently consuming resources.

In 211, the method receives a registration request from the resource requesting participant. In an example embodiment, when the method receives the resource request, the resource requesting participant may be requesting resources for the first time. In this scenario, the resource requesting participant must be registered as a participant before receiving available resources. In an example embodiment, the registration request also contains a participant resource usage description. In another example embodiment, a resource requesting participant may not request permission to access resources if that resource requesting participant has not registered.

In 212, the method registers the resource requesting participant as a potential consumer of available resources. In an example embodiment, when the resource requesting participant requests resources for the first time, the method registers the resource requesting participant as a potential consumer of available resources.

Alternatively, in 213, the method receives resource usage information from the resource requesting participant. In an example embodiment, when the method receives a resource request from a resource requesting participant, the method also receives usage information from the resource requesting participant. In an example embodiment, the resource requesting participant records each resource allocation with the method. In an example embodiment, a resource requesting participant may have both explicit and implicit allocations of the resource. An explicit resource allocation may be allocating memory from a heap, or explicitly creating and writing to a file. An implicit resource allocation may be stack memory allocated for the execution of a routine, or temporary files created implicitly. In an example embodiment, implicit resource allocations may be considered "overhead" and an estimated amount of resources to cover a typical usage recorded when the resource requesting participant starts, and released when the resource requesting participant stops. The method keeps track of the registered amount of the resources being used by each resource requesting participant, as well as the overall total amount of the resources currently in use.

In 214, based on the resource usage information received by the resource requesting participant, the method prioritizes the resource requesting participant with respect to a plurality of resource requesting participants. In an example embodiment, processor prioritizes the relative needs of the resource requesting participant. In an example embodiment, the method may favor a resource requesting participant that is managing a resource that will be used by other resource requesting participants vs. a private resource. In an example embodiment, the method may place resource requesting participants whose resource needs are not as critical as the other resource requesting participants into a separate non-critical group. Resource requesting participants in the non-critical group may be asked to release their resource portions more aggressively.

FIG. 6 is a flowchart of an example embodiment of the present invention when the method determines that an estimated resource usage, associated with the resource request, approaches the first resource threshold.

In 215, the method determines that an estimated resource usage, associated with the resource request, approaches the first resource threshold. In an example embodiment, the method receives a resource request from the resource requesting participant, and, prior to granting permission to access the resources requested, determines the estimated resource usage.

In 216, the method adds the resource request to a total resource usage to obtain the estimated resource usage. In an example embodiment, when the method receives the resource request from the resource requesting participant, the method adds the resource request to the total resources currently in use to determine the estimated resource usage. In determining whether to grant a resource request, the method compares the resource request plus existing usage amount to the absolute maximum amount of the resource available. Only if permission to access the resource is granted is the new usage amount compared against the first threshold.

In 217, the method compares the estimated resource usage to the first resource threshold, after determining whether to grant permission to access the resources requested to the resource requesting participant.

FIG. 7 is a flowchart of an example embodiment of the present invention when the method negotiates with at least one resource consuming participant to voluntarily release resources.

In 218, the method negotiates with at least one resource consuming participant to voluntarily release resources until the estimated resource usage approaches a second resource threshold associated with the available resources within the process. In other words, when the method determines that a resource request will cause the estimated resource usage to approach the first resource threshold (i.e., a "high water mark" of resource usage), the method begins to negotiate with those participants currently consuming resources to voluntarily release enough resources to bring the estimated resource usage down o the second resource threshold (i.e., a "low water mark").

In 219, the method determines a target resource release amount associated with the estimated resource usage approaches the second resource threshold. In an example embodiment, when the method receives a resource request, the method calculates the estimated resource usage based on the amount of resources needed to satisfy the resource request added to the actual resource usage amount. If the estimated resource usage approaches the first resource threshold (i.e., a "high water mark"), the method calculates the amount of resources that would need to be released for the estimated resource usage to approach the second resource threshold (i.e., a "low water mark"). The amount of resources that need to be released is the target resource release amount. In an example embodiment, the target resource release amount is the difference between the first resource threshold and the second resource threshold.

In 220, the method requests that at least one resource consuming participant voluntarily release resources until the target resource release amount is achieved. In other words, the method requests at least one resource consuming participant to release some of the resources they are holding, and the resource consuming participant selects whether to release portions of those resources. The resource consuming participant prioritizes the relative merits of the resource portions it is utilizing, and determines how to best free a resource portion if it selects to do so. The priority of retaining any resource portion will be based on criteria such as LRU (least recently used), least likely to be needed in the near future, the size of the resource allocation, etc. In an example embodiment, the method makes these requests through a series of rounds, beginning with requesting that non-critical, or low priority resource consuming participants voluntarily release their non-critical resources first, and gradually requesting more critical resources, and then requesting that regular priority resource consuming participants begin to voluntarily release their resources until the target resource release amount is achieved. The method determines which of the resources are considered to be non-critical, or low priority. For example, the method may determine that a resource consuming participant is consuming non-critical resources when the resources consuming participant is storing information in memory. This determination may be due to the non-critical nature of the information, the relatively large size, the chance that the information will not be needed again, and/or the ease of re-obtaining the information.

In 221, the method determines that negotiation with at least one resource consuming participant has failed to release sufficient available resources to approach the second resource threshold. In an example embodiment, the method determines that, even after several rounds of requesting that resource consuming participants voluntarily release resources (requesting more critical resources with each round), the target resource release amount still has not been achieved.

In 222, the method repeats the step of requesting that at least one resource consuming participant voluntarily release resources until the target resource release amount is achieved. In an example embodiment, the method performs several rounds of requesting that the resource consuming participants voluntarily release resources. If some resources have been released, but not enough to achieve the target resource release amount, then the method performs the actions in 220 again.

Alternatively, in 223, the method suspends negotiation with at least one resource consuming participant. In an example embodiment, the method performs several rounds of requesting that the resource consuming participants voluntarily release resources. If no resources have been released, the method suspends the process of negotiation with any of the resource consuming participants. In other words, the method 'sleeps'.

In 224, the method resumes negotiation with at least one resource consuming participant. In an example embodiment, when negotiation with resource consuming participants to voluntarily free resources has failed to release any resources, the method suspends the process of negotiation, and then later resumes the process of negotiation.

FIG. 8 is a flowchart of an example embodiment of the present invention when the method negotiates with at least one resource consuming participant to voluntarily release resources.

In 225, the method negotiates with at least one resource consuming participant to voluntarily release resources until the estimated resource usage approaches a second resource threshold associated with the available resources within the process. In an example embodiment, the negotiation may be performed through a series of rounds. In a first round, the method requests that some resource consuming participants (for example, those resource consuming participants that are deemed to be 'non-critical') release non-essential resource portions. The method may request that other resource consuming participants (for example, those resource consuming participants that are not deemed to be 'non-critical') also release non-essential resource portions, but the method may request that the target resource release amount be released in equitable portions among this group of resource consuming participants. In a second round, the method may request that some resource consuming participants (for example, those resource consuming participants that are deemed to be 'non-critical') release all but essential portions of resources. The method may request that other resource consuming participants (for example, those resource consuming participants that are not deemed to be 'non-critical') free all but the most desirable resource portions. In a third round, the method may request that those resource consuming participants not deemed to be "non-critical" release all of the possible remaining portions of resources. If, at any point during these rounds, the method detects that the target resource release amount has been achieved, the method may terminate the rounds of negotiation.

In 226, for each of the resource consuming participants, the method requests that at least one resource consuming participant release the target resource release amount of resources. In an example embodiment, "releasing the resource" means throwing away the data utilizing the resource, transferring the data to a different resource, compressing it, etc. The method may poll the resource consuming participants synchronously in an order of priority (i.e., from low priority to high priority), waiting for each resource consuming participants to reply before sending a message to the next resource consuming participant.

For each of the resource consuming participants, the method receives confirmation that at least one resource consuming participant has released a released amount of resources. In an example embodiment, the resource consuming participant releases the resources first, and then the method receives a message from the resource consuming participants regarding the amount of resources that have been released.

For each of the resource consuming participants, the method recalculates the target resource release amount based on the released amount of resources. In an example embodiment, the method may subtract the amount of resources released by the previous resource consuming participant from the remaining target resource release amount, and communicate the updated target resource release amount to the next resource consuming participant. In an example embodiment, if the method determines that the target resource release amount has been achieved, the method does not request that subsequent resource consuming participants release their resources.

In 227, the method requests that at least one resource consuming participant release only non-essential resources. In an example embodiment, the method requests that some resource consuming participants (for example, those resource consuming participants that are deemed to be 'non-critical') free all but the most desirable resource portions.

Alternatively, in 228, the method requests that at least one resource consuming participant release all but essential resources. In an example embodiment, the method has already requested that some resource consuming participants (for example, those resource consuming participants that are deemed to be 'non-critical') free all but the most desirable resource portions. If the target resource release amount has still not been achieved, the method may ask these resource consuming participants to release all resource portions, other than those resources the resource consuming participants need to remain alive.

Alternatively, in 229, the method requests that at least one resource consuming participant release all of the resources currently consumed. In other words, the method may ask at least one resource consuming participant to 'die'. In an example embodiment, if after several rounds of requesting that resource consuming participants release resources, the method still has not achieved the target resource release amount, the method may request that some resource consuming participants release all their resources, in effect, voluntarily killing their own processes. In an example embodiment, if there are many resource consuming participants, and if the sum of the minimum amount of resources each of the resource consuming participants requires to run exceeds the first resource threshold, then the method may request that at least one resource consuming participant stop (i.e., 'die').

FIG. 9 is a flowchart of an example embodiment of the present invention when the method negotiates with at least one resource consuming participant to voluntarily release resources.

In 230, the method negotiates with at least one resource consuming participant to voluntarily release resources until the estimated resource usage approaches a second resource threshold associated with the available resources within the process. In an example embodiment, the method requests that each of the resource consuming participants release their fair share of resources to achieve the target resource release amount.

In 231, the method requests an equitable portion of the target resource release amount from each of the resource consuming participants. In an example embodiment, the method may have already requested, and received resources from some of the resource consuming participants, but may still not have achieved the target resource release amount. The method may divide the target resource release amount by the number of resource consuming participants, and request that each resource consuming participants release an equitable portion of resources. In another example embodiment, the method may calculate a fair share for each resource consuming participant, depending on how much of the resources each resource consuming participant is currently consuming. In another example embodiment, resource consuming participants considered to be 'non-critical' may have already been asked to release resources, and the remaining resource consuming participants may be asked to release resources according to an equitable goal amount.

In the example embodiment, determining an equitable goal amount for each regular resource consuming participant to release requires the current resource usage of the resource consuming participant to be considered. If n is the number of resource consuming participants, using a uniform distribution and asking each resource consuming participant to release 1/nth of the target resource release amount will not succeed in releasing the target amount if any resource consuming participant is using less than 1/nth of the target resource release amount. The target resource release amount is the original target resource release amount minus the amount of resource released during previous negotiation. Therefore, two "equitable" goal resource release amounts are computed for each resource consuming participant. The first goal resource release amount uses a uniform distribution. The second goal resource release amount considers the resource usage of each resource consuming participant. Ideally, no resource consuming participant should have to give up more than the minimum of 1/nth of the target resource release amount (i.e., the uniform distribution amount) and a "fair share" percentage of the amount of the resource that the resource consuming participant is using. The "fair share percentage" (fairSharePct) is 1/n. However, a fair share percentage of 1/n may not be sufficient to reach the target resource release amount if some resource consuming participants are using very little memory, and the target resource release amount is large. Let sumPartResourceUsage=sum(resource usage of each resource consuming participant). If each resource consuming participant is only required to release a fair share percent of the resource, sumPartResourceUsage*fairSharePct represents the largest amount of the resource that could be released. To ensure the target resource release amount is reached, a value for fairSharePct for which tgtAmount<= (sumPartResourceUsage*fairSharePct) needs to be determined. The equation for solving for fairSharePct and equality becomes:

fairSharePct=*tgt*Amount/regularPartResourceUsage

Therefore, a formula for fairSharePct that satisfies the inequality is:

fairSharePct=max((*tgt*Amount/sumPartResourceUsage),1/*n*)

Both of these distributions need to be considered to determine an equitable goal amount for each resource consuming participant to free that will result in a good chance of releasing the target resource release amount. Initially, the amount for each resource consuming participant to free is set to the minimum of the uniform distribution amount and the fair share percentage amount for that participant. If at least one resource consuming participant cannot release the uniform distribution amount (for example, if it is greater than their fair share percentage amount), those participants for which the uniform distribution amount is less than their fair share percentage amount will be asked to give up more until the target resource release amount is reached. In other words, those participants who are using more resources may be asked to give up more to cover up the shortfall in reaching the target resource release amount, but without asking any resource consuming participant to release more than its fair share percentage amount. The revised fair share percentage amounts may still be insufficient to reach the target goals, since the resource consuming participants are asked to only release there least desirable resource portions. The revised amounts increase the odds that the target resource release amount will be achieved, while still being equitable.

The algorithm, in pseudocode, is defined as follows:

```
amtBeingUsed = FirstThreshold – resourceReleasedRound1A;
sumPartResourceUsage = sum(resource usage of each resource consuming participant);
partFairShareUniform = 1/n * tgtAmount ;
fairSharePct = max((tgtAmount / sumPartResourceUsage), 1/n);
for ( each resource consuming participant)
{
partFairShareByPct[partNum] = partResourceUsage * fairSharePct;
partAmtToFree[partNum] = min(partFairShareUniform, partFairShareByPct);
amountDistributed += partAmtToFree[partNum];
if (partFairShareUniform < partFairShareByPct)
numPartsCouldReleaseMore++;
}
amountToDistribute = tgtAmount – amountDistributed;
if ( amountToDistribute != 0)
{
    //This means resource consuming participants are not using enough resource to be
    //able to give up the uniform distribution amount. How much to ask those that are
    //using less than their fair share percent to give up more is then determined. Add the
    //participant numbers for these resource consuming participants to an array, sorted in
    //ascending order of partFairShareByPct.
    (sortedPartNumsToReleaseMore)
    for ( i = 0; i < numPartsCouldReleaseMore, i++)
    {
        partNum = sortedPartNumsToReleaseMore[i];
        amountToDistributePerPart =
        amountToDistribute / (numPartsCouldReleaseMore – i);
        addToPart = min(amountToDistributePerPart,
        (sortedPartFairShareByPct[partNum] – partAmtToFree[partNum]));
        amountToDistribute –= addToPart;
        partAmtToFree[partNum] += addToPart;
    }
}
```

In 232, the method receives a released amount of resources. In an example embodiment, the method requests a group of resource consuming participants to release their resources. In response, the method receives the released amount of resources from the resource consuming participants. In this example embodiment, the method has received the resources asynchronously.

In 233, the method recalculates the target resource release amount based on the released amount of resources received. In an example embodiment, based on the amount of released resources received, the method recalculates the target resource release amount, and determines if the target resource release amount has been achieved.

FIG. 10 is a flowchart of an example embodiment of the present invention when the method negotiates with at least one resource consuming participant to voluntarily release resources.

In 234, the method negotiates with at least one resource consuming participant to voluntarily release resources until the estimated resource usage approaches a second resource threshold associated with the available resources within the process. In an example embodiment, the method may prioritize at least one resource consuming participant prior to negotiation.

In 235, the method prioritizes the resources used by at least one resource consuming participant with respect to other resources in use.

In 236, the method requests, in the order of priority of the resources, that at least one resource consuming participant releases the target resource release amount of resources, and then receives confirmation that at least one resource consuming participant has released a released amount of resources.

In 237, the method recalculates the target resource release amount based on the released amount of resources received during the negotiation.

Alternatively, in 238, the method prioritizes at least one resource consuming participant with respect to at least one other resource consuming participant. In an example embodiment, the method may prioritize the resource consuming participants in terms of "non-critical" and "regular" priorities. In another example embodiment, the method may prioritize the resource consuming participants with respect to the other resource consuming participants within each of the groups of "non-critical" and 'regular". These resource consuming participants are prioritized from low priority to high priority with respect to the resources in use by each of the resource consuming participants within that group.

In 239, the method iteratively requests from each of the resource consuming participants to voluntarily release resource according to a priority associated with each of resource consuming participants until the target resource release amount is achieved.

Figure 11:
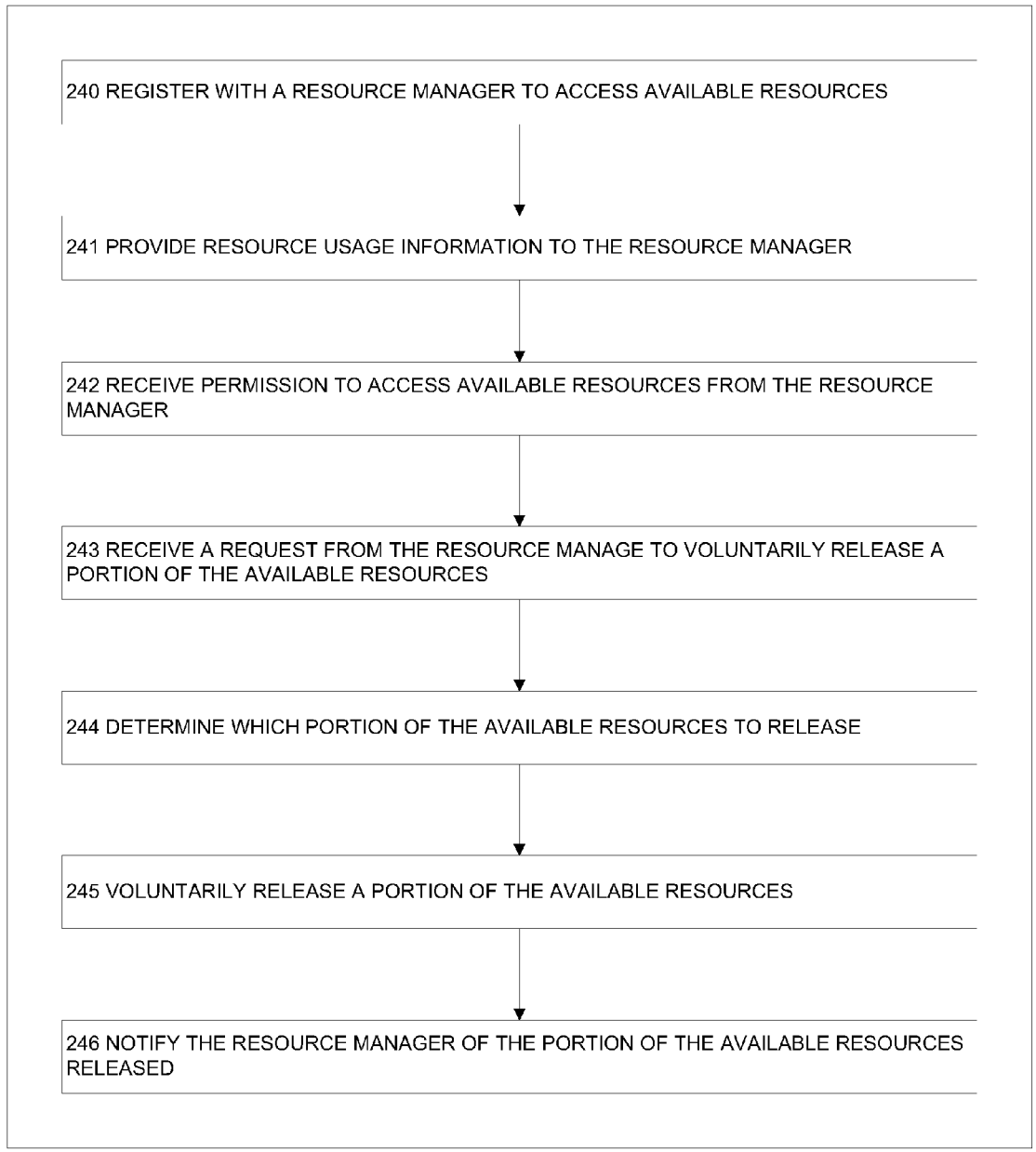
FIG. 11 is a flowchart illustrating an embodiment of a method for managing resources where the method registers with a resource manager to access available resources, according to the present invention.

FIG. 11 is a flowchart of an example embodiment of the present invention when the method registers with a resource manager to access available resources.

In 240, the method registers with a resource manager to access available resources. In an example embodiment, the method operates as a thread within a process. The method communicates with a resource manager to obtain resources. Prior to obtaining resources, the method must register with the resource manager.

In 241, the method provides resource usage information to the resource manager. In an example embodiment, during the registration process, the method provides resource usage information to the resource manager. The resource manager keeps track of the registered amount of the resources being used by each thread, as well as the overall total amount of the resources currently in use.

In 242, the method receives permission to access available resources from the resource manager. In an example embodiment, in response to requesting available resources from the resource manager, the method receives permission to access those resources.

In 243, the method receives a request from the resource manage to voluntarily release a portion of the available resources. In an example embodiment, the resource manager has received a resource request from a resource consuming participant, and the method receives the request from the resource manager to voluntarily release resources. In an example embodiment, the method receives a request from the resource manager to voluntarily release resources only when the resource manager has received a resource request from a resource requesting participant, and the estimated resource usage (calculated based on the resource request) approaches the first resource threshold. In other words, a resource consuming participant will only be asked to release resources when a resource requesting participant's request for resources causes the estimated resource usage to approach the first resource threshold.

In 244, in response to the request from the resource manager to release resources, the method determines which portion of the available resources to release. In 245, the method voluntarily releases a portion of the available resources. In 246, the method notifies the resource manager of the portion of the available resources released. In an example embodiment, the method first releases resources, and then notifies the resource manager of the amount of resources released.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing resources by a computing system comprising a processor, comprising:
    identifying a first resource threshold associated with available resources;
    receiving, by the processor, a resource request from a resource requesting participant requiring the available resources;
    determining, by the processor, that an estimated resource usage, associated with the resource request, approaches the first resource threshold; and
    negotiating, by the processor, with at least one resource consuming participant to voluntarily release resources until the estimated resource usage approaches a second resource threshold associated with the available resources, wherein the negotiating comprises:
        prioritizing the at least one resource consuming participant with respect to at least one other resource consuming participant; and
        iteratively requesting from each of the at least one resource consuming participant to voluntarily release resource according to a priority associated with each of the at least one resource consuming participant until a target resource amount is achieved, wherein the target resource amount is associated with the estimated resource usage approaching the second resource threshold, and wherein the priority is determined by the prioritizing.

2. The method of claim 1 further comprising:
    granting, by the processor, the resource requesting participant permission to access the available resources associated with the resource request, the available resources obtained from resources voluntarily released by the at least one resource consuming participant.

3. The method of claim 1 wherein receiving the resource request from the resource requesting participant requiring the available resources comprises:
    receiving resource usage information from the resource requesting participant; and
    based on the resource usage information, prioritizing the resource requesting participant with respect to a plurality of resource requesting participants.

4. The method of claim 1 wherein negotiating with the at least one resource consuming participant to voluntarily release resources until the estimated resource usage approaches the second resource threshold associated with the available resources comprises:
    determining a target resource release amount associated with the estimated resource usage approaches the second resource threshold; and
    requesting that the at least one resource consuming participant voluntarily release resources until the target resource release amount is achieved.

5. The method of claim 4 wherein requesting that the at least one resource consuming participant voluntarily release resources until the target resource release amount is achieved comprises:
for each of the at least one resource consuming participant:
i) requesting that the at least one resource consuming participant release the target resource release amount of resources;
ii) receiving confirmation that the at least one resource consuming participant has released a released amount of resources; and
iii) recalculating the target resource release amount based on the released amount of resources.

6. The method of claim 4 wherein requesting that the at least one resource consuming participant voluntarily release resources until the target resource release amount is achieved comprises:
requesting an equitable portion of the target resource release amount from each of the at least one resource consuming participant;
in response, receiving a released amount of resources; and
recalculating the target resource release amount based on the released amount of resources received.

7. The method of claim 4 wherein requesting that the at least one resource consuming participant voluntarily release resources until the target resource release amount is achieved comprises:
prioritizing the resources used by the at least one resource consuming participant with respect to other resources in use;
in order of a priority of the resources:
i) requesting that the at least one resource consuming participant release the target resource release amount of resources; and
ii) receiving confirmation that the at least one resource consuming participant has released a released amount of resources; and
recalculating the target resource release amount based on the released amount of resources.

8. A computer program product for managing resources, the computer program product comprising:
a computer readable memory device having computer readable program code embodied therewith, the computer readable program code configured to:
identify a first resource threshold associated with available resources;
receive a resource request from a resource requesting participant requiring the available resources;
determine that an estimated resource usage, associated with the resource request, approaches the first resource threshold; and
negotiate with at least one resource consuming participant to voluntarily release resources until the estimated resource usage approaches a second resource threshold associated with the available resources, wherein the negotiating comprises:
prioritizing the at least one resource consuming participant with respect to at least one other resource consuming participant; and
iteratively requesting from each of the at least one resource consuming participant to voluntarily release resource according to a priority associated with each of the at least one resource consuming participant until a target resource amount is achieved, wherein the target resource amount is associated with the estimated resource usage approaching the second resource threshold, and wherein the priority is determined by the prioritizing.

9. The computer program product of claim 8, wherein the computer readable program code is further configured to:
grant the resource requesting participant permission to access the available resources associated with the resource request, the available resources obtained from resources voluntarily released by the at least one resource consuming participant.

10. The computer program product of claim 8, wherein the computer readable program code configured to receive the resource request from the resource requesting participant requiring the available resources is further configured to:
receive resource usage information from the resource requesting participant; and
based on the resource usage information, prioritize the resource requesting participant with respect to a plurality of resource requesting participants.

11. The computer program product of claim 8, wherein the computer readable program code configured to negotiate with the at least one resource consuming participant to voluntarily release resources until the estimated resource usage approaches the second resource threshold associated with the available resources is further configured to:
determine a target resource release amount associated with the estimated resource usage approaches the second resource threshold; and
request that the at least one resource consuming participant voluntarily release resources until the target resource release amount is achieved.

12. The computer program product of claim 11, wherein the computer readable program code configured to request that the at least one resource consuming participant voluntarily release resources until the target resource release amount is achieved is further configured to:
for each of the at least one resource consuming participant:
i) request that the at least one resource consuming participant release the target resource release amount of resources;
ii) receive confirmation that the at least one resource consuming participant has released a released amount of resources; and
iii) recalculate the target resource release amount based on the released amount of resources.

13. The computer program product of claim 11, wherein the computer readable program code configured to request that the at least one resource consuming participant voluntarily release resources until the target resource release amount is achieved is further configured to:
request an equitable portion of the target resource release amount from each of the at least one resource consuming participant;
in response, receive a released amount of resources; and
recalculate the target resource release amount based on the released amount of resources received.

14. The computer program product of claim 11, wherein the computer readable program code configured to request that the at least one resource consuming participant voluntarily release resources until the target resource release amount is achieved is further configured to:
prioritize the resources used by the at least one resource consuming participant with respect to other resources in use;
in order of a priority of the resources:

i) request that the at least one resource consuming participant release the target resource release amount of resources; and
ii) receive confirmation that the at least one resource consuming participant has released a released amount of resources; and recalculate the target resource release amount based on the released amount of resources.

15. A system comprising:
a processor; and
a computer readable memory device, having computer readable program code embodied therewith, the computer readable program code configured to:
identify a first resource threshold associated with available resources;
receive a resource request from a resource requesting participant requiring the available resources;
determine that an estimated resource usage, associated with the resource request, approaches the first resource threshold; and
negotiate with at least one resource consuming participant to voluntarily release resources until the estimated resource usage approaches a second resource threshold associated with the available resources, wherein the negotiating comprises:
prioritizing the at least one resource consuming participant with respect to at least one other resource consuming participant; and
iteratively requesting from each of the at least one resource consuming participant to voluntarily release resource according to a priority associated with each of the at least one resource consuming participant until a target resource amount is achieved, wherein the target resource amount is associated with the estimated resource usage approaching the second resource threshold, and wherein the priority is determined by the prioritizing.

16. The system of claim 15, wherein the computer readable program code is further configured to:
grant the resource requesting participant permission to access the available resources associated with the resource request, the available resources obtained from resources voluntarily released by the at least one resource consuming participant.

17. The system of claim 15, wherein the computer readable program code configured to receive the resource request from the resource requesting participant requiring the available resources is further configured to:
receive resource usage information from the resource requesting participant; and
based on the resource usage information, prioritize the resource requesting participant with respect to a plurality of resource requesting participants.

18. The system of claim 15, wherein the computer readable program code configured to negotiate with the at least one resource consuming participant to voluntarily release resources until the estimated resource usage approaches the second resource threshold associated with the available resources is further configured to:
determine a target resource release amount associated with the estimated resource usage approaches the second resource threshold; and
request that the at least one resource consuming participant voluntarily release resources until the target resource release amount is achieved.

19. The system of claim 18, wherein the computer readable program code configured to request that the at least one resource consuming participant voluntarily release resources until the target resource release amount is achieved is further configured to:
for each of the at least one resource consuming participant:
i) request that the at least one resource consuming participant release the target resource release amount of resources;
ii) receive confirmation that the at least one resource consuming participant has released a released amount of resources; and
iii) recalculate the target resource release amount based on the released amount of resources.

20. The system of claim 18, wherein the computer readable program code configured to request that the at least one resource consuming participant voluntarily release resources until the target resource release amount is achieved is further configured to:
request an equitable portion of the target resource release amount from each of the at least one resource consuming participant;
in response, receive a released amount of resources; and
recalculate the target resource release amount based on the released amount of resources received.

* * * * *